April 12, 1960

W. A. PAULSON 2,932,733

TRANSMITTER FOR A REMOTE CONTROL SYSTEM

Filed Nov. 18, 1957

INVENTOR.
WILLIAM A. PAULSON
BY Carlson, Pitzner, Hubbard & Wolfe
ATTORNEYS

United States Patent Office 2,932,733
Patented Apr. 12, 1960

2,932,733

TRANSMITTER FOR A REMOTE CONTROL SYSTEM

William A. Paulson, Rockford, Ill., assignor to Barber-Colman Company, Rockford, Ill., a corporation of Illinois Application November 18, 1957, Serial No. 697,242
7 Claims. (Cl. 250—17)

This invention relates generally to a mobile transmitter carried by a vehicle and utilizing power derived from the vehicle storage battery to generate and transmit signals of different character in a predetermined sequence for selective response by a remote receiver. More particularly, the invention relates to a transmitter having a motor driven multiple switch mechanism controlling the sequence of the output signals and the transmission of power from the storage battery both to the driving motor and to a generator providing the output signals.

The primary object of the invention is to construct and arrange the motor and power transmitting parts for cooperation with the switch mechanism in a novel manner to achieve simplicity and low cost in the construction of the transmitter while enabling the sequence of signals to be transmitted in a very short time and still insuring that the transmitter is reliable in rapidly repeated operations.

Another object is to utilize the motor and the power transmitting parts in a novel manner to stop the switch mechanism precisely after each sequence of output signals has been sent.

A more detailed object is to connect a condenser in the power transmitting circuits in a novel manner such that it performs the two functions of smoothing pulsating direct current and storing energy for bringing the driven parts to a quick stop at the end of each signal sequence.

The invention also resides in the novel and simple construction of the switch mechanism to facilitate adjustment of the sequence of output signals.

Other objects and advantages of the invention will become apparent from the following detailed description taken in connection with the accompanying drawings, in which Figure 1 is a schematic view and wiring diagram of a transmitter embodying the novel features of the present invention.

Figures 1, 2, 3:
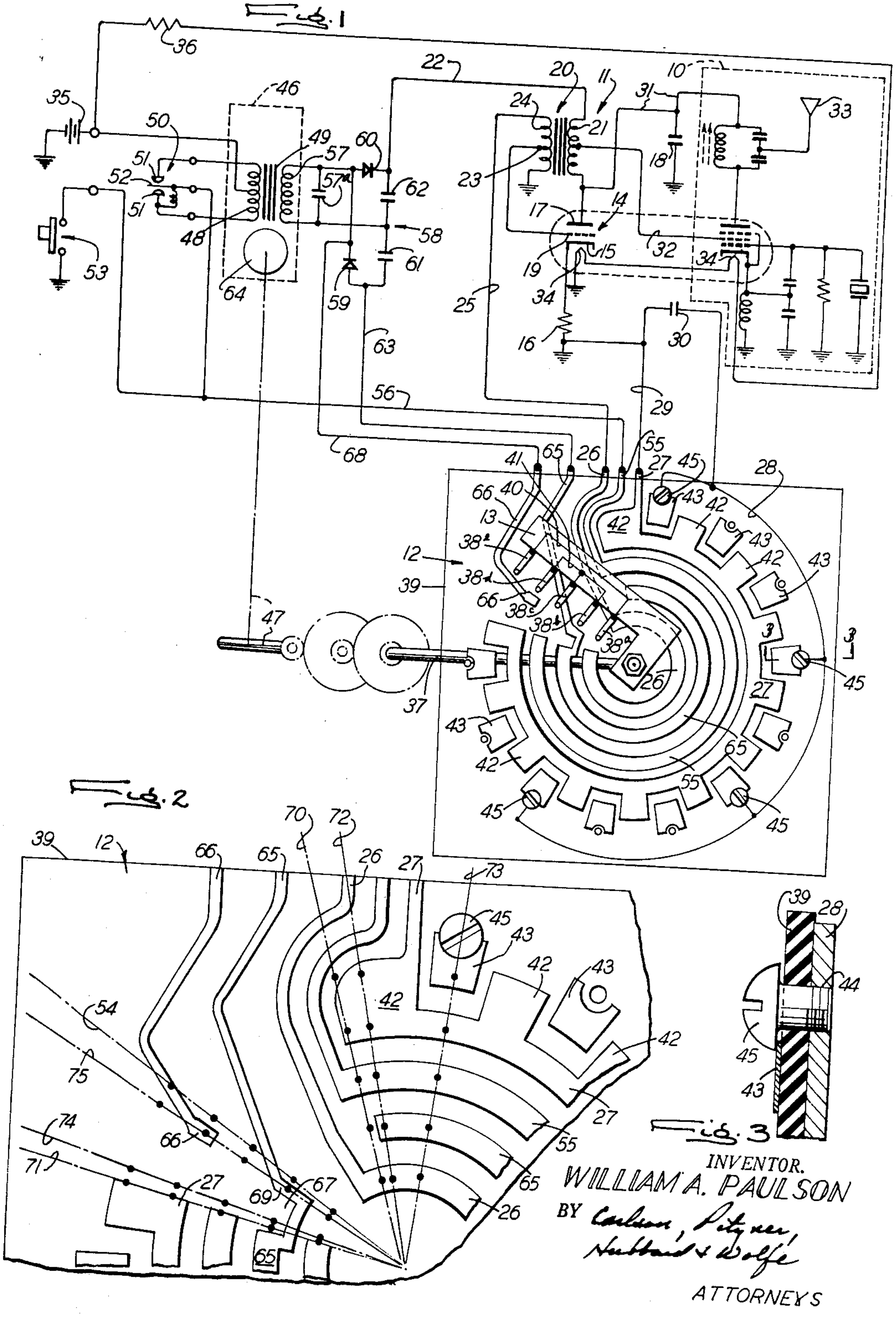
Fig. 2 is an enlarged fragmentary schematic view of the switch mechanism showing different positions of the wiper.
Fig. 3 is a fragmentary sectional view taken along the line 3—3 of Fig. 1.

The transmitter shown in the drawings to illustrate the present invention is especially adapted for use in an automotive vehicle to generate and transmit a radio signal suitable for selective response by a receiver (not shown) at some point remote from the vehicle. Herein, the signal comprises a carrier wave generated by a radio frequency oscillator 10 of well known construction and amplitude modulated by pulses of different lower frequencies on the order of 700 and 1200 cycles per second. These pulses are derived from an audio frequency oscillator 11 and follow one another in a preselected sequence under the control of a multiple switch mechanism 12 having an actuator 13 and operable during advance of the latter to render different tuning circuits of the oscillator effective to provide the different pulses.

The audio oscillator 11 comprises a triode 14 having its cathode 15 grounded through a resistor 16 and its plate 17 connected to ground through a capacitor 18 and coupled to the grid 19 by a tuning transformer 20. The primary winding 21 of the latter is connected between the plate and an input conductor 22. An intermediate tap 23 of the secondary winding 24 is connected directly to the grid and the ends of the secondary are connected respectively to ground and through a conductor 25 to a contact element 26 of the switch mechanism 12. Other contact elements 27 and 28 of the mechanism are connected to the cathode ground connection respectively through a conductor 29 and through a tuning capacitor 30.

When the contact elements 26 and 27 and thus the conductors 25 and 29 are connected together so that the transformer secondary 24 is short circuited through ground, there are no audio oscillations to modulate the carrier wave. If the contact elements 26 and 28 are interconnected so that the tuning capacitor 30 is in series with the secondary, oscillations are generated at the lower modulating frequency which is determined by the reactance values of this capacitor, the plate capacitor 18 and the tuning transformer. Oscillations at the higher frequency are generated when all of the contact elements and their conductors are disconnected from each other, this frequency being the resonant frequency of the transformer and the plate capacitor 18.

The audio oscillations are applied to the radio frequency oscillator 10 by connecting the audio oscillator plate 17 through a conductor 31 to one input terminal of the radio frequency oscillator and connecting an intermediate tap of the transformer primary 21 through a conductor 32 to another input terminal. Such oscillations amplitude modulate the carrier wave which radiates from a suitable antenna 33 connected to the output of the radio frequency oscillator. Current for the heater elements 34 of the oscillator tubes is derived from the vehicle battery 35 through a series circuit including a resistor 36.

The switch mechanism 12 is of the rotary type and the actuator 13 comprises an arm of insulating material secured to a rotatably mounted shaft 37 and supporting a plurality of radially spaced wipers or movable contact elements 38*a* to 38*e*. The latter are flexible strips of conducting material projecting circumferentially from the actuator arm with their outer ends alined radially and movable in a common plane and in concentric circular paths about the axis of the shaft. Cooperating with the wipers to form switches are a plurality of fixed contact elements including the grounded element 27 and the element 26 connected by the conductor 25 to the tuning transformer secondary 24. These fixed elements are insulated from each other and are arranged in different positions in the paths of the various wipers for engagement by the latter in a desired sequence. In the present instance, the fixed contact elements are areas of conducting material such as copper secured to and raised from one side of a flat plate 39 of insulating material and formed in the desired pattern in a well known printed circuit photographic process.

To complete circuits through the fixed contact elements as they are engaged by the wipers 38*a* to 38*e*, the wipers are interconnected by conductors 40 and 41 carried on the actuator arm 13. Herein, there are five wipers with the inner and outer ones 38*a* and 38*e* connected by one conductor 40 and the intervening ones 38*b*, 38*c* and 38*d* connected by the other conductor 41. For convenience of description, the wipers may be considered consecutively as the first, the second and so on starting with the innermost wiper 38*a* as the first and the outermost wiper 38*e* as the fifth.

The switch elements 26 and 27 for the short circuit around the tuning transformer secondary 24 are arranged for alternate completion and interruption of the circuit so that the successive audio modulating pulses are separated by short periods of no oscillation. For this purpose, the element 26 which is connected by the conductor 25 to the transformer secondary is formed as a ring positioned for contact with the first wiper 38*a*. The grounded element 27 comprises a ring spaced inwardly from the path of the fifth wiper 38*e* but having circumferentially spaced radial projections 42 located in such path. The short circuit then is completed through the conductor 29 when the fifth wiper is contacting one of the projections and the first wiper is contacting the contact element 26 for the secondary.

Intervening between the grounded projections 42 in the path of the fifth wiper 38*e* are conducting areas 43 of segmental shape which are adapted for selective connection to the switch element 28 for the tuning capacitor 30. To facilitate such connection and thereby render the sequence of modulating audio frequency pulses easily changeable, this element is formed as a strip of conducting material secured flat against the side of the insulating plate 39 opposite the conducting areas and having holes 44 (Fig. 3) registering with holes which extend through the insulating plate at the outer ends of the segmental areas 43. Each hole 44 in the conducting strip is threaded to receive a screw 45 whose head engages the adjacent segmental area to complete the connection between the latter and the tuning capacitor 30 when the fifth wiper is contacting the segment. With this arrangement, the sequence of modulating pulses may be changed simply by changing the number and the locations of screws used.

Rotation of the switch actuator arm 13 is effected by a motor 46 having its output shaft 47 coupled directly to the actuator shaft 37 through reduction gearing. The motor is an alternating current induction motor of the shaded pole type having an energizing winding 48 wound on a magnetic field core 49. Alternating current for energizing this winding is derived from the battery 35 of the vehicle in this instance through a suitable vibrator or circuit interrupter 50 having fixed contacts 51 connected to the terminals of the winding and a movable contact 52 connected to the grounded side of the battery through separate parallel circuits. One of the latter extends through a normally open, manually operable start switch 53 and the other or maintaining circuit extends through the multiple switch mechanism 12. To complete these energizing circuits, a center tap of the winding is connected directly to the ungrounded terminal of the battery.

When either of the circuits between the movable vibrator contact 52 and ground is completed, a full wave alternating voltage is applied to the motor winding 48 and the motor thus is energized to rotate the switch actuator arm 13. The direction of such rotation herein is clockwise as viewed in Figs. 1 and 2. To maintain the motor energized after the start switch 53 is opened and during advance of the switch arm to provide the sequence of modulating signal pulses, the maintaining circuit paralleling the start switch between ground and the movable vibrator contact 52 is closed after the arm leaves a starting position (indicated by a line 54 in Fig. 2) and while it advances through a partial revolution from such position. For this purpose, the switch mechanism 13 includes an intermediate fixed conducting area 55 in the form of a ring connected to the vibrator contact by a conductor 56 and positioned adjacent the grounded contact ring 27 for engagement by the third wiper 38*c* on the switch arm. When this wiper engages the ring and the fourth wiper 38*d* engages the grounded ring 27, the conductor 41 between these wipers completes the circuit between the vibrator contact and the ground. In this instance the grounded ring 27 and the intermediate ring 55 are substantially coextensive angularly and each extends through approximately four-fifths of a revolution of the switch arm.

In addition to driving the switch arm 13, the motor 46 also is utilized to convert the 6 or 12 volts normally available from the battery 35 to a higher voltage such as 300 volts suitable for operating the oscillators 10 and 11. This is accomplished by the addition of a secondary winding 57 which is wound on the core 49 and cooperates with the latter and the main winding 48 to form a transformer. The alternating voltage induced in the secondary is converted to a unidirectional voltage by a rectifier and filter network 58. The latter comprises two rectifiers 59 and 60 each connected in series with a different one of two smoothing capacitors 61 and 62 across the secondary, the polarities of the rectifiers being reversed so that current flows alternately to one and then the other capacitor in successive half cycles of the voltage induced in the secondary winding 57. The capacitors also are connected in series with each other and the sum of the voltages across both capacitors is applied to the oscillators by connecting the positive terminal of one capacitor 62 through the conductor 22 to the primary 21 of the tuning transformer 20 and connecting the negative terminal of the other capacitor 61 to ground through another conductor 63. For a purpose and in a manner to appear later, the latter conductor is connected to ground through the switch mechanism 12. To reduce arcing at the vibrator contacts 51, 52, an additional capacitor 57*a* is connected directly across the motor secondary.

To permit advance of the switch arm 13 through its partial revolution at a rapid rate and still avoid repeating of the sequence of modulating signal pulses unless the start switch 53 is closed, the secondary motor winding 57 and the rectifier and filter unit 59 are utilized in a novel manner to retain control of the arm and prevent the same from coasting beyond the starting position 54 after each sequence is completed. For this purpose, energy is stored in one smoothing capacitor 61 when the maintaining circuit through the conductor 56 and the intermediate contact ring 55 is closed and, after this circuit is interrupted, such energy is discharged through the secondary to produce a unidirectional flux in the core 49 and the motor rotor 64 to bring the latter and the switch arm to an abrupt and controlled stop. The storage of energy is effected by interrupting the supply circuit for the oscillators 10 and 11 through the conductor 63 while the motor maintaining circuit is still closed. To discharge the energy, a short circuit is completed around the rectifier 59 associated with the energy storage capacitor 61 and the latter thereby is connected directly across the secondary.

The desired sequence of operation of the oscillator supply circuit through the conductors 22 and 63, the motor maintaining circuit through the conductor 56 and the contact ring 55, and the capacitor discharge circuit through the motor secondary 57 is effected herein by the addition of two fixed conducting areas 65 and 66 to the switch mechanism 12 and properly correlating the shapes and locations of these areas with the previously described areas 26, 27, 42, 43 and 55. The first area 65 which may be termed the capacitor switching area is connected through the conductor 63 to the negative terminal of the energy storage capacitor 61 and comprises a ring concentric with and adjacent the innermost ring 26 and located in the path of the second wiper 38*b*. When the latter engages the capacitor switching ring and the fourth wiper 38*d* engages the grounded contact ring 27, the oscillator supply circuit is completed through the switch arm conductor 41.

The end of the capacitor switching ring 65 first engaged by its wiper 38*b* is spaced a short distance inwardly from the corresponding end of the maintaining circuit ring 55 so that the oscillator supply circuit is completed after the motor maintaining circuit during advance of the switch arm from the starting position 54. At the other end, the capacitor switching ring is recessed as indicated at 67 short of the corresponding ends of the maintaining ring and the grounded ring 27 so that the oscillator circuit is interrupted before the maintaining circuit thereby permitting the capacitor to store the braking energy.

The other conducting area 66 which may be termed the rectifier shunting area cooperates with the capacitor switching ring 65 to complete the capacitor discharge circuit after interruption of the motor maintaining circuit but before the switch arm 13 reaches its starting position 54. For this purpose, the shunting area is connected by a conductor 68 to the terminal of the rectifier 59 remote from the braking capacitor 61 and comprises a strip extending into the path of the fourth wiper **38*d* between the ends of the grounded ring 27. Radially alined with this strip is a strip 69 (Fig. 2) on the capacitor switching area 65 beyond the recess 67. When these strips are contacted by the associated wipers 38*b* and 38*d*, a short circuit is completed around the rectifier 59 and through the switch arm conductor 41 and conductors 63 and 68** so that the capacitor is connected directly across the secondary. These strips are narrow circumferentially so that the discharge circuit is completed only momentarily.

In the operation of the transmitter let it be assumed that the switch arm 13 is in its starting position as shown in Fig. 1 and indicated by the line 54 in Fig. 2 and that the start switch 53 is open. All circuits through the switch mechanism 13 then are interrupted and the motor 46 and the oscillators 10 and 11 are deenergized. Upon closure of the start switch, a circuit is completed through the battery 35, the vibrator 50 and the motor primary 48 and the motor switch arm is energized to rotate the switch arm in a clockwise direction from the start position. All circuits remain open while the arm moves a short distance to a first active position indicated by a line 70 in Fig. 2. In this position, the third and fourth wipers **38*c* and 38*d* engage the maintaining and grounded rings 55 and 27 to complete the motor maintaining circuit through the conductor 41 on the switch arm. Such contact continues and the motor remains energized until the arm reaches the end of the partial revolution as indicated by a line 71, the latter and the starting line 54** defining the partial revolution during which the sequence of code pulses is transmitted.

In the first active position 70, the second wiper **38*b* is out of contact with the capacitor switching area 65 so that the oscillator supply circuit is open. Also, although the first wiper 38*a* engages the innermost contact ring 26, the fifth wiper 38*e* has not reached the grounded ring 27 and the circuit through the secondary 24 of the tuning transformer 20 also is open. Upon rotation of the switch arm 13 a short distance beyond the first active position, the second and fifth wipers ride onto the capacitor switching area 65 and a projection 42 of the grounded contact 27 respectively as indicated along a line 72 to complete the oscillator supply circuit and to short circuit the tuning transformer secondary. The radio frequency oscillator 10 then begins to oscillate but the audio oscillator 11 is rendered non-oscillatory so that an unmodulated carrier signal is transmitted from the antenna 33**.

As the switch arm 13 continues to advance to the end 71 of the partial revolution, the fifth wiper **38*e* alternates in its engagement of the grounded projections 42 and the intervening segmental conducting areas 43. When each of the latter is engaged, the carrier wave is modulated by one or the other of the audio frequencies depending on the presence or absence of a selector screw 45 which connects the segmental area to the tuning capacitor 30 through the conducting strip 28. If a screw is present, for example, in the first modulating position of the switch arm indicated by a line 73** in Fig. 2, the modulating pulse is of the lower frequency. If there is no screw, no circuit is completed through the tuning transformer secondary and the audio oscillator oscillates at the higher modulating frequency. Herein, there are eleven segmental areas and thus eleven modulating positions for the switch arm. Screws are inserted at only the first, fourth, sixth and ninth modulating positions. Considering A as a lower frequency pulse and B as one of the higher frequency, the sequence of modulating pulses with this arrangement of selector screws then is

ABBABABBABB

When the switch arm 13 reaches the end of the partial revolution as indicated by the line 71, the second wiper **38*b* rides off of the capacitor switching area 65 and into the recess 67 thereof so that the oscillator supply circuit is interrupted. The braking capacitor 61 then becomes charged substantially to the peak value of the voltage across the motor secondary winding 57. Upon continued advance of the switch arm to a position indicated by a line 74 just beyond the end of the partial revolution, all of the wipers ride off of the conducting areas to interrupt all circuits through the switch mechanism 12. The arm and all other parts driven by the motor then coast until the second and fourth wipers 38*b* and 38*d* contact the radially alined strips 66 and 69 as indicated along a line 75. This results in completion of the short circuit around the rectifier 59 and through the conductors 56 and 68 so that the capacitors may discharge through the motor secondary winding 57 and bring the parts to an abrupt stop with the switch arm substantially in the starting position, the discharge circuit opening as the arm moves into this position. The transmitter then has completed one cycle and is ready for the start of another cycle upon closure of the start switch 53**.

It will be apparent that the secondary winding 57 on the motor core 49 not only enables the motor to function as a transformer so as to reduce the number of parts and thus simplify the transmitter, but also provides a means for applying braking energy to the motor. The braking capacitor 61 also performs a dual function of smoothing the pulsating direct current and storing the energy for braking the motor. Such functions are made possible by constructing the switch mechanism 12 so that first the oscillator supply circuit is interrupted, then the motor maintaining circuit is opened, and finally the capacitor discharge circuit is completed. Due to the arrangement of the segmental areas 43 and the conducting strip 28 on opposite sides of the insulating plate 39 with the screws 45 for interconnecting these parts, the switching mechanism may be adjusted easily to obtain different sequences of the modulating pulses.

I claim as my invention:

1. In a transmitter, the combination of, a signal generator having a plurality of control circuits and providing different output signals when the respective circuits are rendered effective, programming switch mechanism controlling said circuits and including a rotary element for rendering the circuits effective selectively in a sequence during rotation of the element through a partial revolution from a starting position, actuating means for said rotary element comprising an alternating current induction motor having a field core and primary and secondary windings wound on the core, said core and windings constituting a step-up transformer for converting an alternating voltage applied to the primary winding to a higher alternating voltage across said secondary winding, an alternating voltage energizing circuit for said primary winding maintained closed by said mechanism during rotation of said element through said partial revolution and interrupted as the element reaches the end of the partial revolution, a full wave rectifier and filter means operable to convert said higher alternating voltage to a unidirectional voltage and including a rectifier and a capacitor connected in series with each other across said secondary winding, a circuit completed by said mechanism to apply said unidirectional voltage to said signal means and interrupted before said primary energizing circuit is opened, and a shunt circuit around said rectifier completed by said mechanism for discharge of said capacitor through said secondary winding after interruption of said primary circuit.

2. The combination of claim 1 in which said switch mechanism comprises a plate of insulating material, a wiper carried by said rotary element and movable in a circular path across one side of said plate, a plurality of flat segments of conducting material secured to said one plate side in said path for successive engagement by said wiper as the latter advances, a strip of conducting material secured against the other side of said plate and having spaced holes registering with alined holes in said plate and each of said sections, and conducting members removably secured in preselected ones of said alined holes to connect the associated sections to said strip, said generator providing one of said signals when said wiper is engaging one of said sections which is connected to said strip by one of said conducting members and a different signal when the wiper engages a section without a conducting member connecting the section to the strip.

3. In a transmitter, the combination of, a signal generator having a plurality of control circuits and providing different output signals when the respective circuits are rendered effective and a multiple switch mechanism for rendering said circuits effective in a sequence, said mechanism comprising a plate of insulating material, an actuator having a wiper movable across one side of said plate during advance of the actuator, a plurality of flat sections of conducting material secured against said one plate side and arranged in a series in the path of said wiper for successive engagement by the wiper during its advance, a flat strip of conducting material secured against the other side of said plate and having spaced holes alined with corresponding holes in said plate and the respective conducting sections, and removable conducting members extending through selected different ones of said alined holes to connect the associated sections and said strip, said generator providing one of said signals when said wiper is engaging one of said sections which is connected to said strip by one of said conducting members and a different signal when the wiper engages a section without a conducting member connecting the section to the strip.

4. In a transmitter, the combination of, a signal generator having an input and a plurality of control circuits and providing different output signals when the respective circuits are rendered effective, an alternating current motor having a driven member and a magnetic field member, primary and secondary windings wound on and cooperating with said field member to form a step-up transformer, a primary circuit operable when closed to apply an alternating voltage to said primary winding for driving said driven member and inducing a secondary alternating voltage in said secondary winding, means including a rectifier and a condenser connected in series across said secondary winding for converting said secondary voltage to a unidirectional voltage, a circuit operable when closed to apply said unidirectional voltage to said generator input, a shunt circuit operable when closed to complete a short circuit around said rectifier, and multiple switch mechanism controlling the completion and interruption of said circuits and having an actuator connected to said driven member, said switch mechanism operating during advance of said actuator to maintain said primary circuit closed as the actuator moves through a predetermined range from a starting position and open the circuit as the actuator reaches the end of the range, to close said unidirectional voltage circuit when the actuator is within the range and open the circuit before the primary circuit is open, to render said control circuits effective in a sequence when the unidirectional voltage circuit is closed, and to complete said shunt circuit after the primary circuit is open for discharge of said condenser through said secondary winding to stop said driven member.

5. In a transmitter, the combination of a multiple switch mechanism having an actuator movable through a predetermined range from a starting position, an alternating current motor having a magnetic field member and a driven member connected to said actuator for advancing the latter, primary and secondary windings wound on and cooperating with said field member to form a transformer, a primary circuit closed by said switch mechanism during advance of said actuator throughout said range and opened as the actuator reaches the end of the range, said primary circuit operating when closed to apply a fluctuating voltage to said primary winding for driving said driven member and inducing a secondary alternating voltage in said secondary winding, means including a rectifier and a condenser connected in series across said secondary winding for converting said secondary voltage to a unidirectional voltage, a signal generator operable when rendered effective to provide different output signals, means including a control circuit for applying said unidirectional voltage to said generator and operable when the circuit is closed to render the generator effective, said switch mechanism operating during advance of said actuator to complete said control circuit and then interrupt the same both while said primary circuit is opened, and a shunt circuit completed around said rectifier by said switch mechanism for discharge of said condenser through said secondary winding to stop said driven member quickly after said primary circuit is opened.

6. In a transmitter, the combination of an alternating current motor having a magnetic field member, a first winding wound on the field member, and a driven member, a multiple switch mechanism having an actuator connected to and driven by said driven member, a primary circuit operable when closed to apply an alternating energizing voltage to said winding, said mechanism controlling said circuit and maintaining the same closed durng advance of said actuator through a predetermined range from a starting position and then interrupting the circuit, a secondary winding on said field member, a rectifier and a capacitor connected in series across said secondary winding for converting to a unidirectional voltage the alternating voltage induced in the winding upon energization of said first winding, an output device, a circuit closed by said mechanism during advance of said actuator within said range to apply said unidirectional voltage to said output device, said mechanism interrupting said circuit to said output device before said primary circuit is opened, and a shunt circuit completed around said rectifier by said switch mechanism for discharge of said condenser through said secondary winding to stop said driven member quickly after said primary circuit is opened.

7. In a transmitter, the combination of a multiple switch mechanism having an actuator movable through a predetermined range from a starting position, an alternating current motor having a magnetic field member and a driven member connected to said actuator for advancing the latter, primary and secondary windings wound on and cooperating with said field member to form a transformer, a primary circuit closed by said switch mechanism during advance of said actuator throughout said range and opened as the actuator reaches the end of the range, said primary circuit operating when closed to apply a fluctuating voltage to said primary winding for driving said driven member and inducing a secondary alternating voltage in said secondary winding, a signal generator operable when rendered effective to provide different output signals, and means including a control circuit extending between said secondary winding and said generator and operable when the circuit is closed to apply secondary voltage to the generator to render the same effective, said switch mechanism operating during advance of said actuator to complete said control circuit while said primary circuit is closed.

References Cited in the file of this patent

UNITED STATES PATENTS

| | | |
|---|---|---|
| 1,275,657 | Bullock | Aug. 13, 1918 |
| 2,389,786 | Kohn | Nov. 27, 1945 |
| 2,675,544 | Trimble | Apr. 13, 1954 |
| 2,704,334 | Brailsford | Mar. 15, 1955 |